United States Patent
Mochida et al.

(10) Patent No.: US 8,785,051 B2
(45) Date of Patent: Jul. 22, 2014

(54) NONAQUEOUS-ELECTROLYTE BATTERY AND METHOD FOR PRODUCING THE SAME

(75) Inventors: Yasushi Mochida, Itami (JP); Mitsuyasu Ueda, Itami (JP); Kentaro Yoshida, Itami (JP); Tomoharu Takeyama, Itami (JP); Kazuhiro Goto, Itami (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/816,939

(22) PCT Filed: Aug. 24, 2011

(86) PCT No.: PCT/JP2011/069016
§ 371 (c)(1),
(2), (4) Date: Feb. 14, 2013

(87) PCT Pub. No.: WO2012/026480
PCT Pub. Date: Mar. 1, 2012

(65) Prior Publication Data
US 2013/0143128 A1    Jun. 6, 2013

(30) Foreign Application Priority Data

Aug. 26, 2010 (JP) ................................ 2010-189590
Mar. 23, 2011 (JP) ................................ 2011-064400

(51) Int. Cl.
*H01M 10/0561* (2010.01)
*H01M 10/0562* (2010.01)
*H01M 10/052* (2010.01)
*H01M 4/131* (2010.01)

(52) U.S. Cl.
CPC ...... *H01M 10/0561* (2013.01); *H01M 10/0562* (2013.01); *H01M 10/052* (2013.01); *H01M 4/131* (2013.01); *H01M 2300/0068* (2013.01); *H04M 2300/0094* (2013.01)
USPC ...... 429/231.95; 429/340; 429/345; 429/209; 429/281.1

(58) Field of Classification Search
CPC .............. Y02E 60/122; H01M 10/058; H01M 10/0562; H01M 4/131; H01M 2300/0068; H01M 2300/0094
USPC .......................... 429/340, 209, 218.1, 231.95
See application file for complete search history.

(56) References Cited

U.S. PATENT DOCUMENTS

| 2009/0061288 | A1* | 3/2009 | Gordon et al. | ................... 429/50 |
| 2009/0074953 | A1* | 3/2009 | Chang et al. | .................... 427/74 |
| 2009/0269670 | A1* | 10/2009 | Tsuchida | ................. 429/231.95 |

FOREIGN PATENT DOCUMENTS

JP    2001-273928    10/2001

(Continued)

*Primary Examiner* — Patrick Ryan
*Assistant Examiner* — Ben Lewis
(74) *Attorney, Agent, or Firm* — Drinker Biddle & Reath LLP

(57) ABSTRACT

Provided are a nonaqueous-electrolyte battery in which short circuits between the positive- and negative-electrode layers can be suppressed with certainty and a method for producing the battery. A nonaqueous-electrolyte battery 100 includes a positive-electrode active-material layer 12 containing a Li-containing oxide; a negative-electrode active-material layer 22 on which deposition of Li metal can occur; and a sulfide-solid-electrolyte layer (SE layer) 3 disposed between these active-material layers 12 and 22. The SE layer 3 of the nonaqueous-electrolyte battery 100 includes a powder-formed layer 31 and a dense-film layer 32 formed on a surface of the powder-formed layer 31 by a vapor-phase process. In the nonaqueous-electrolyte battery 100, the powder-formed layer 31 is formed by a compression-molding process on a positive-electrode body including the positive-electrode active-material layer 12 and the dense-film layer 32 is then formed by a vapor-phase process on the positive-electrode body that is provided with the powder-formed layer 31 and serves as a substrate.

9 Claims, 2 Drawing Sheets

(56) References Cited

FOREIGN PATENT DOCUMENTS

| | | | |
|---|---|---|---|
| JP | 2009-199920 | 9/2009 | |
| JP | 2009-259696 | 11/2009 | |
| JP | 2009-277381 | 11/2009 | |
| JP | 2009-301959 | * 12/2009 | ............ H01M 10/36 |

* cited by examiner

NONAQUEOUS-ELECTROLYTE BATTERY AND METHOD FOR PRODUCING THE SAME

TECHNICAL FIELD

The present invention relates to a nonaqueous-electrolyte battery including a positive-electrode active-material layer containing a Li-containing oxide, a negative-electrode active-material layer on which deposition of Li metal can occur, and a sulfide-solid-electrolyte layer disposed between these active-material layers; and a method for producing the nonaqueous-electrolyte battery.

BACKGROUND ART

Nonaqueous-electrolyte batteries including a positive-electrode layer, a negative-electrode layer, and an electrolyte layer disposed between these electrode layers have been used as power supplies of electric devices that are intended to be repeatedly charged and discharged. The electrode layers of such a battery include a collector having a current-collecting function and an active-material layer containing an active material. Among such nonaqueous-electrolyte batteries, in particular, nonaqueous-electrolyte batteries that are charged and discharged through migration of Li ions between the positive- and negative-electrode layers have a high discharge capacity in spite of the small size.

Examples of the technique of producing such a nonaqueous-electrolyte battery are described in Patent Literatures 1 and 2. Patent Literature 1 states that a positive-electrode active material, an electrolyte material, and a negative-electrode active material that are in powder form are charged into a mold so as to form layers and are compression-molded to thereby produce an all-solid-state nonaqueous-electrolyte battery. Patent Literature 2 states that a positive-electrode active-material layer, an electrolyte layer, and a negative-electrode active-material layer are sequentially formed by a vapor-phase process on a steel use stainless (SUS) substrate that is to serve as a positive-electrode collector to thereby produce an all-solid-state nonaqueous-electrolyte battery.

Here, in recent years, for the purpose of enhancing the performance of nonaqueous-electrolyte batteries, the following has been proposed: in a nonaqueous-electrolyte battery, a Li-containing oxide is used as the positive-electrode active material, a sulfide is used as the electrolyte, and Li metal or a Li alloy is used as the negative-electrode active material (refer to Patent Literature 2).

CITATION LIST

Patent Literature

PTL 1: Japanese Unexamined Patent Application Publication No. 2001-273928
PTL 2: Japanese Unexamined Patent Application Publication No. 2009-199920

SUMMARY OF INVENTION

Technical Problem

However, when such a nonaqueous-electrolyte battery in PTL 1 or 2 is repeatedly charged and discharged, a short circuit sometimes occurs between the positive- and negative-electrode layers. When the short circuit occurs, the voltage of the battery considerably decreases.

The main cause for the short circuit lies in that needle-shaped Li crystals (dendrites) generated on the surface of the negative-electrode active-material layer during charge of the nonaqueous-electrolyte battery grow through repeated charge and discharge of the nonaqueous-electrolyte battery and reach the positive-electrode active-material layer. In such a nonaqueous-electrolyte battery in PTL 1 or 2, the solid electrolyte layer is supposed to physically block the growth of dendrites so that the short circuit is less likely to occur. However, this effect is not sufficient and short circuits may occur in some usages of the nonaqueous-electrolyte battery.

The present invention has been accomplished under the above-described circumstances. An object of the present invention is to provide a nonaqueous-electrolyte battery in which short circuits between the positive- and negative-electrode layers can be suppressed with more certainty; and a method for producing the nonaqueous-electrolyte battery.

Solution to Problem

The inventors of the present invention thoroughly studied the mechanism by which short circuits occur in the nonaqueous-electrolyte batteries described in PTLs and, as a result, have found the following findings.

Since the solid electrolyte layer of the nonaqueous-electrolyte battery in PTL 1 is formed by compressing powder, it has a structure having a plurality of fine pores therein. Among the pores, in portions facing the negative-electrode active-material layer, dendrites tend to be generated. The dendrites having been generated tend to grow to other pores in the solid electrolyte layer. This is probably the mechanism by which short circuits occur in the batteries having a solid electrolyte layer provided by forming powder.

In contrast, the solid electrolyte layer of the nonaqueous-electrolyte battery in PTL 2 is formed by a vapor-phase process. Accordingly, it is denser than the powder-compact solid electrolyte layer in PTL 1 and substantially has no pores. However, since the solid electrolyte layer formed by a vapor-phase process is dense, defects such as cracking tend to occur during charge and discharge of the electrolyte battery. A main cause for the cracking is the positive-electrode active-material layer of which volume changes due to repeated occlusion and release of Li ions during charge and discharge of the battery. When a defect is generated in the solid electrolyte layer, from the defect, dendrites probably grow, resulting in the occurrence of short circuits.

On the basis of the findings described above, a nonaqueous-electrolyte battery according to the present invention and a method for producing the nonaqueous-electrolyte battery are defined below.

(1) A nonaqueous-electrolyte battery according to the present invention includes a positive-electrode active-material layer containing a Li-containing oxide; a negative-electrode active-material layer on which deposition of Li metal can occur; and a sulfide-solid-electrolyte layer disposed between these active-material layers. The sulfide-solid-electrolyte layer in this nonaqueous-electrolyte battery according to the present invention includes a powder-formed layer formed on a positive-electrode-active-material-layer side of the sulfide-solid-electrolyte layer, and a dense-film layer formed on a surface of the powder-formed layer by a vapor-phase process.

In a nonaqueous-electrolyte battery including a sulfide-solid-electrolyte layer that includes a powder-formed layer and a dense-film layer, short circuits are less likely to occur even when the battery is repeatedly charged and discharged. This is probably achieved mainly by the following two reasons. The first reason is that the dense-film layer formed on a surface of the powder-formed layer fills open pores on the surface side of the powder-formed layer, that is, the negative-electrode-active-material-layer side of the powder-formed layer; thus, the growth paths of dendrites are blocked. The second reason is that the powder-formed layer having pores therein and disposed near the positive-electrode active-material layer absorbs a stress caused by volume change of the positive-electrode active-material layer due to charge and discharge of the battery; thus, damage to the sulfide-solid-electrolyte layer due to charge and discharge of the battery can be suppressed.

(2) In a nonaqueous-electrolyte battery according to an embodiment of the present invention, the sulfide-solid-electrolyte layer preferably has a thickness of 1 mm or less.

When the sulfide-solid-electrolyte layer has such a thickness, short circuits between the positive and negative electrodes can be suppressed with certainty and the size of the nonaqueous-electrolyte battery does not become excessively large. In view of meeting the demand for reduction of the size of nonaqueous-electrolyte batteries in recent years, the thickness of the sulfide-solid-electrolyte layer is preferably minimized as long as the short circuits can be suppressed. For example, the thickness of the layer may be 100 µm or less.

(3) In a nonaqueous-electrolyte battery according to an embodiment of the present invention, the powder-formed layer preferably has a thickness of 900 µm or less.

In view of meeting the demand for reduction of the size of nonaqueous-electrolyte batteries, the thickness of the powder-formed layer is also preferably reduced. For example, the powder-formed layer may have a thickness of 100 µm or less. Here, considering that the powder-formed layer has a function of absorbing a stress caused by volume change of the positive-electrode active-material layer due to charge and discharge of the nonaqueous-electrolyte battery, the powder-formed layer needs to have such a thickness that can exhibit the function. From this viewpoint, the powder-formed layer preferably has a thickness of 10 µm or more.

(4) In a nonaqueous-electrolyte battery according to an embodiment of the present invention, the dense-film layer preferably has a thickness of 100 µm or less.

In view of the demand for reduction of the size of nonaqueous-electrolyte batteries, the thickness of the dense-film layer is also preferably reduced. The dense-film layer may have a thickness of 20 µm or less. Here, considering that the dense-film layer has a function of filling pores in a surface of the powder-formed layer, the dense-film layer needs to have such a thickness that can exhibit the function. From this viewpoint, the dense-film layer preferably has a thickness of 1 µm or more.

(5) In a nonaqueous-electrolyte battery according to an embodiment of the present invention, the sulfide-solid-electrolyte layer preferably includes an additional powder-formed layer, and the additional powder-formed layer is formed between the dense-film layer and the negative-electrode active-material layer.

In this embodiment, even when the negative-electrode active-material layer has high surface roughness, the additional powder-formed layer prevents contact between the surface of the negative-electrode active-material layer and the dense-film layer. Accordingly, generation of thin portions in the dense-film layer can be suppressed.

(6) In a nonaqueous-electrolyte battery according to an embodiment of the present invention, a dense-film-layer-side surface of the additional powder-formed layer desirably has a surface roughness Rz of 1 µm or less.

In this embodiment, generation of thin portions in the dense-film layer can be suppressed. In addition, even when the dense-film layer is formed so as to have a small thickness, growth of dendrites can be suppressed.

(7) The present invention provides a method for producing a nonaqueous-electrolyte battery including a positive-electrode active-material layer containing a Li-containing oxide, a negative-electrode active-material layer on which deposition of Li metal can occur, and a sulfide-solid-electrolyte layer disposed between these active-material layers, the method including the following steps.

A step of producing a positive-electrode body including the positive-electrode active-material layer.

A step of forming a powder-formed layer serving as a part of the sulfide-solid-electrolyte layer, on the positive-electrode body.

A step of forming a dense-film layer serving as a part of the sulfide-solid-electrolyte layer, on the powder-formed layer by a vapor-phase process.

This method for producing a nonaqueous-electrolyte battery according to the present invention allows production of a nonaqueous-electrolyte battery according to the present invention including a sulfide-solid-electrolyte layer that includes a powder-formed layer disposed on the positive-electrode-active-material-layer side of the sulfide-solid-electrolyte layer and a dense-film layer formed on a surface of the powder-formed layer.

(8) In a method for producing a nonaqueous-electrolyte battery according to an embodiment of the present invention, the powder-formed layer may be formed by a compression-molding process.

In order to form the powder-formed layer by a compression-molding process, for example, the positive-electrode body is first produced; the produced positive-electrode body and a sulfide-electrolyte powder are placed in a mold and are compression-molded together. Alternatively, a powder serving as the raw material of the positive-electrode active-material layer and a sulfide-electrolyte powder may be charged into a mold so as to form layers and the powders may be compressed together. In this case, the positive-electrode body and the powder-formed layer are simultaneously produced. In order to form the dense-film layer, for example, the positive-electrode body provided with the powder-formed layer may be placed in a vacuum chamber and a sulfide electrolyte may be evaporated in the chamber.

(9) In a method for producing a nonaqueous-electrolyte battery according to an embodiment of the present invention, the powder-formed layer may be formed by a coating process.

In order to form the powder-formed layer by a coating process, for example, the positive-electrode body is prepared and the positive-electrode body is coated with a slurry containing a sulfide-electrolyte powder; the slurry is then dried and, if necessary, hot-pressed.

(10) In a method for producing a nonaqueous-electrolyte battery according to an embodiment of the present invention, the positive-electrode body may be produced by preparing a positive-electrode collector and forming the positive-electrode active-material layer on the positive-electrode collector by a coating process.

When the positive-electrode active-material layer of the positive-electrode body is formed by a coating process, as with the formation of the powder-formed layer by a coating process, the positive-electrode collector may be coated with a slurry and the slurry may be dried and hot-pressed.

(11) A method for producing a nonaqueous-electrolyte battery according to an embodiment of the present invention may include a step of producing a positive-electrode-body-side multilayer body, the step including a substep of producing a positive-electrode body including the positive-electrode active-material layer; a substep of forming a powder-formed layer serving as a part of the sulfide-solid-electrolyte layer, on the positive-electrode body; and a substep of forming a dense-film layer serving as a part of the sulfide-solid-electrolyte layer, on the powder-formed layer by a vapor-phase process; a step of producing a negative-electrode-body-side multilayer body, the step including a substep of producing a negative-electrode body including the negative-electrode active-material layer; a substep of forming a powder-formed layer serving as a part of the sulfide-solid-electrolyte layer, on the negative-electrode body; and a substep of forming a dense-film layer serving as a part of the sulfide-solid-electrolyte layer, on the powder-formed layer by a vapor-phase process; and a step of press-bonding the positive-electrode-body-side multilayer body and the negative-electrode-body-side multilayer body together such that the dense-film layers of the multilayer bodies are in contact with each other.

According to this embodiment, a nonaqueous-electrolyte battery including a solid-electrolyte layer including two powder-formed layers and a dense-film layer formed therebetween can be produced.

Advantageous Effects of Invention

In a nonaqueous-electrolyte battery according to the present invention, short circuits due to dendrites generated during charge of the battery can be effectively suppressed. A method for producing a nonaqueous-electrolyte battery according to the present invention can provide a nonaqueous-electrolyte battery according to the present invention.

DESCRIPTION OF EMBODIMENTS

First Embodiment

Overall Configuration of Nonaqueous-Electrolyte Battery

Figure 1:
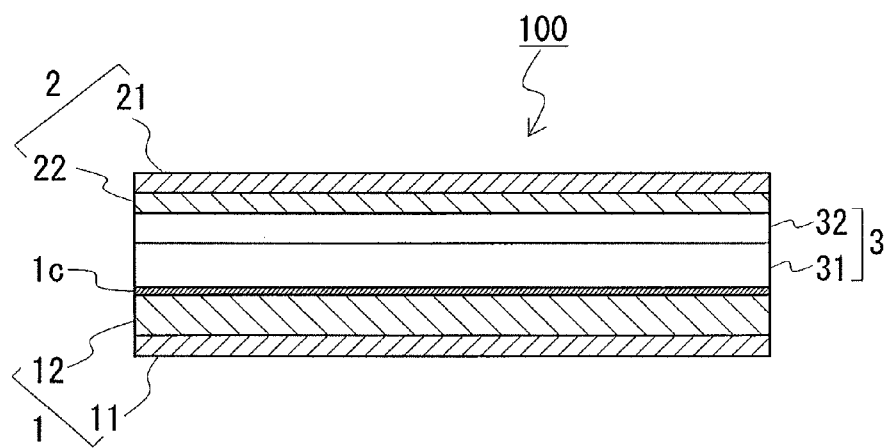
FIG. 1 is a longitudinal sectional view of a nonaqueous-electrolyte battery described in a first embodiment.

A nonaqueous-electrolyte battery 100 illustrated in FIG. 1 includes a positive-electrode layer 1, an intermediate layer 1c, a sulfide-solid-electrolyte layer (SE layer) 3, and a negative-electrode layer 2. The positive-electrode layer 1 includes a positive-electrode collector 11 and a positive-electrode active-material layer 12. The negative-electrode layer 2 includes a negative-electrode collector 21 and a negative-electrode active-material layer 22. A novel feature of the battery 100 is that the SE layer 3 of the battery 100 includes a powder-formed layer 31 formed by compressing a sulfide electrolyte and a dense-film layer 32 formed by a vapor-phase process on the powder-formed layer 31.

[Positive-Electrode Collector]

The positive-electrode collector 11 may be constituted by a conductive material only or a conductive-material film formed on an insulating substrate. In the latter case, the conductive-material film functions as a collector. The conductive material is preferably any one selected from Al, Ni, alloys of the foregoing, and stainless steel.

[Positive-Electrode Active-Material Layer]

The positive-electrode active-material layer 12 contains a Li-containing oxide that is a positive-electrode active material serving as a main material of the battery reaction. The positive-electrode active material may be a substance having a layered rock-salt crystal structure, for example, a substance represented by $Li\alpha_x\beta_{(1-X)}O_2$ ($\alpha$ represents one or more selected from Co, Ni, and Mn; $\beta$ represents one or more selected from Fe, Al, Ti, Cr, Zn, Mo, and Bi; X is 0.5 or more). Specific examples of the substance include $LiCoO_2$, $LiNiO_2$, $LiMnO_2$, $LiCo_{0.5}Fe_{0.5}O_2$, $LiCo_{0.5}Al_{0.5}O_2$, and $LiNi_{0.5}Co_{0.15}Al_{0.05}O_2$ ($\alpha$=Co+Ni, $\beta$=Al, and X=0.95). Alternatively, the positive-electrode active material may be a substance having a spinel crystal structure (for example, $LiMn_2O_4$) or a substance having an olivine crystal structure (for example, $Li_xFePO_4$ (0<X<1)).

The positive-electrode active-material layer 12 may contain, in addition to such a positive-electrode active material, a sulfide electrolyte. In this case, the discharge capacity of the nonaqueous-electrolyte battery 100 can be increased. The content of the sulfide electrolyte in the positive-electrode active-material layer 12 is preferably as follows: sulfide electrolyte/(sulfide electrolyte+positive-electrode active material)(×100)=10 to 50 mass %.

The thickness of the positive-electrode active-material layer 12 is not particularly limited. The thickness of the positive-electrode active-material layer 12 may be determined in accordance with desired performance of the nonaqueous-electrolyte battery 100 to be produced.

[Intermediate Layer]

The intermediate layer 1c is a layer that suppresses an increase in the resistance between the SE layer 3 (powder-formed layer 31) described below and the positive-electrode active-material layer 12. The sulfide solid electrolyte contained in the powder-formed layer 31 may react with an oxide serving as a positive-electrode active material in the positive-electrode active-material layer 12, so that a high-resistance layer is formed. However, by forming the intermediate layer 1c, the formation of the high-resistance layer can be suppressed and a decrease in the discharge capacity of the battery 100 during charge and discharge can be suppressed.

A material used for the intermediate layer 1c may be an amorphous Li-ion-conductive oxide, such as $LiNbO_3$ or $LiTaO_3$. In particular, $LiNbO_3$ allows effective suppression of an increase in the resistance of the near-interface region between the positive-electrode active-material layer 12 and the powder-formed layer 31.

[Powder-Formed Layer]

The powder-formed layer 31 serving as a part of the SE layer 3 can be formed by compression-molding a Li-ion-conductive powder composed of a sulfide. An example of the sulfide is $Li_2S$—$P_2S_5$. The sulfide may contain an oxide that enhances the reduction resistance of the powder-formed layer 31, such as $P_2O_5$.

The powder-formed layer 31 includes a large number of fine pores due to the formation method thereof. This is because the powder-formed layer 31 is formed by compressing powder and the particles cannot be completely bonded together without gaps. However, because of the presence of pores, the powder-formed layer 31 has high deformability and is less likely to be damaged by an external stress. Accordingly, during charge and discharge of the Li-ion battery 100, even when the volume of the positive-electrode active-material layer 12 changes, the powder-formed layer 31 disposed near the positive-electrode active-material layer 12 is not damaged and absorbs the stress caused by the volume change. The number of pores and the size of pores in the powder-formed layer 31 vary in accordance with, for example, the shape or size of the particles or pressure applied in the formation of the powder-formed layer 31.

As to the thickness of the powder-formed layer 31, in view of reducing the size of the nonaqueous-electrolyte battery 100, the thickness is preferably 900 µm or less, more preferably 100 µm or less. In view of reducing the stress, the thickness of the powder-formed layer 31 is preferably 10 µm or more. The larger the thickness of the powder-formed layer 31, the greater the effect of reducing the stress. Accordingly, the thickness of the powder-formed layer 31 may be appropriately selected in accordance with the thickness of the positive-electrode active-material layer 12, which is a factor dictating the magnitude of the stress.

[Dense-Film Layer]

The dense-film layer 32 serving as a part of the SE layer 3 is formed by a vapor-phase process on the negative-electrode-layer-2-side surface of the powder-formed layer 31. As with the powder-formed layer 31, the dense-film layer 32 is formed of a Li-ion-conductive sulfide. The dense-film layer 32 may be formed of a sulfide that is the same as or different from the sulfide of the powder-formed layer 31.

Since the dense-film layer 32 is formed by a vapor-phase process, it substantially has no pores. Accordingly, the dense-film layer 32 can fill pores in the surface of the powder-formed layer 31. By covering the surface of the powder-formed layer 31 with the dense-film layer 32, the growth paths of dendrites extending through the SE layer 3 in the thickness direction can be substantially eliminated.

As to the thickness of the dense-film layer 32 formed, in view of reducing the size of the nonaqueous-electrolyte battery 100, the thickness is preferably 100 µm or less, more preferably 20 µm or less. In view of filling pores in the surface of the powder-formed layer 31, the thickness of the dense-film layer 32 is preferably 1 µm or more.

As to the total thickness of the dense-film layer 32 and the powder-formed layer 31, that is, the thickness of the SE layer 3, in view of reducing the size of the nonaqueous-electrolyte battery 100, the thickness is preferably 1 mm or less, more preferably 100 µm or less. The thickness ratio between the powder-formed layer 31 and the dense-film layer 32 is preferably in the range of 10:1 to 1:1. In view of the functions of the layers 31 and 32, the powder-formed layer 31 is desirably formed thicker than the dense-film layer 32.

[Negative-Electrode Active-Material Layer]

The negative-electrode active-material layer 22 contains a negative-electrode active material serving as a main material of the battery reaction. On the negative-electrode active-material layer 22, deposition of Li metal can occur. The negative-electrode active material is preferably metal Li or a Li alloy. When the negative-electrode active-material layer 22 is formed of metal Li or a Li alloy, a problem that the discharge capacity becomes much lower than the charge capacity (that is, the problem of generation of irreversible capacity) in the first charge-discharge cycle can be almost overcome.

[Negative-Electrode Collector]

The negative-electrode collector 21 is constituted by a conductive material formed on the negative-electrode active-material layer 22. For example, the conductive material is preferably any one selected from Cu, Ni, Fe, Cr, and alloys of the foregoing (such as SUS).

<<Advantages of Nonaqueous-Electrolyte Battery>>

In the nonaqueous-electrolyte battery 100 having the above-described configuration, occurrence of short circuits between the positive-electrode layer 1 and the negative-electrode layer 2 during charge and discharge of the battery 100 can be effectively suppressed. This is because the SE layer 3 is constituted by the powder-formed layer 31 and the dense-film layer 32. The negative-electrode-layer-2-side surface of the powder-formed layer 31 that includes a large number of pores is covered with the dense-film layer 32 that substantially has no pores. As a result, growth of dendrites can be physically suppressed. In addition, the powder-formed layer 31, which is disposed on the positive-electrode-active-material-layer-12 side, includes a large number of pores therein. As a result, the powder-formed layer 31 can absorb the stress caused by the volume change of the positive-electrode active-material layer 12 during charge and discharge of the battery 100. Accordingly, the SE layer 3 is less likely to be damaged during charge and discharge of the battery 100.

When the powder-formed layer 31 is formed of solid-electrolyte powder having high plastic deformability, it has a surface having lower surface roughness than the surface of the positive-electrode active-material layer 12. Accordingly, by forming the dense-film layer 32 not on the positive-electrode active-material layer 12 but on the powder-formed layer 31, local variations in the thickness of the dense-film layer 32 can be suppressed and the dense-film layer 32 can be formed as a film having a smooth surface.

<<Method for Producing Nonaqueous-Electrolyte Battery>>

The nonaqueous-electrolyte battery 100 can be produced by the following steps of a method for producing a nonaqueous-electrolyte battery according to the present invention.

(A) Produce a positive-electrode body including the positive-electrode active-material layer 12

(B) Form the powder-formed layer 31 on the positive-electrode body (C) Form the dense-film layer 32 on the powder-formed layer 31

(D) Form the negative-electrode layer 2 on the dense-film layer 32

* As described below, Steps A and B may be simultaneously performed.

<<Step A: Production of Positive-electrode Body>>

Production of the positive-electrode body may be performed [1] prior to Step B of the formation of the powder-formed layer 31 or [2] simultaneously with Step B described below. In this section of Step A, the case of [1] is described. The case of [2] will be described in the section of Step B described below.

The positive-electrode body may be constituted by the positive-electrode active-material layer 12 only or the positive-electrode collector 11 and the positive-electrode active-material layer 12. When a positive-electrode body constituted by the positive-electrode active-material layer 12 only is produced, powder serving as raw material (positive-electrode active-material powder and optionally a conductive aid such as electrolyte powder or acetylene black) may be compression-molded. In this case, the positive-electrode collector 11 may be formed on the positive-electrode body at a desired timing, for example, after Step B or Step C.

In order to produce a positive-electrode body in which the positive-electrode collector 11 and the positive-electrode active-material layer 12 are integrated, a substrate serving as the positive-electrode collector 11 may be first prepared and the positive-electrode active-material layer 12 may then be formed on the substrate. In this case, the positive-electrode active-material layer 12 may be formed by compression-molding powder serving as raw material or by a vapor-phase process such as a vacuum deposition process or a laser ablation process. Alternatively, the positive-electrode active-material layer 12 may be formed by a coating process on the positive-electrode collector 11. The conditions for forming the positive-electrode active-material layer 12 by a coating process are substantially similar to conditions for forming the powder-formed layer 31 by a coating process described below. Accordingly, descriptions of the conditions are omitted here.

Here, when the intermediate layer 1c is formed in the nonaqueous-electrolyte battery 100, the intermediate layer 1c may be formed on a surface of the positive-electrode body by a vapor-phase process or the like after Step A.

<<Step B: Formation of Powder-Formed Layer>>

The powder-formed layer 31 may be formed by a compression-molding process or a coating process. The compression-molding process is first described.

[Compression-Molding Process]

In order to form the powder-formed layer 31, a sulfide powder having an average particle size of about 0.5 to about 2 μm is first prepared. The positive-electrode body produced by Step A is then placed in a mold and the sulfide powder is further placed on the positive-electrode body. The sulfide powder is compressed together with the positive-electrode body to form the powder-formed layer 31 on a surface of the positive-electrode body. The pressure applied is preferably 100 to 700 MPa. After the compression, a heat treatment may be performed. In this case, the temperature is preferably 100° C. to 300° C.

There is another compression-molding process: a powder serving as the raw material of the positive-electrode active-material layer 12 and a powder serving as the raw material of the powder-formed layer 31 are charged into a mold so as to form layers and the powders are compression-molded together. In this case, Steps A and B are simultaneously performed to produce the positive-electrode body provided with the powder-formed layer 31. In addition, a metal foil that is to serve as the positive-electrode collector 11 may be placed at the bottom within the mold and a body in which the members 11, 12, and 31 have been integrated may be produced at one time. In any of the cases, the pressure applied is preferably 100 to 700 MPa; when a heat treatment is performed after the compression, the temperature is preferably 100° C. to 300° C. When the intermediate layer 1c is formed, the raw material of the intermediate layer 1c may also be prepared in the form of powder and charged into the mold.

[Coating Process]

When the powder-formed layer 31 is formed by a coating process, a slurry containing a sulfide solid electrolyte is first prepared. The slurry contains, in addition to the solid electrolyte, a binder such as an epoxy resin or silicone and a solvent such as ethylene glycol monoethyl ether acetate or heptane.

The slurry is applied to the positive-electrode active-material layer 12, may then be dried at 20° C. to 200° C. for about 1 to about 60 minutes, and then preferably subjected to hot pressing at 100° C. to 300° C. and at about 100 to about 600 MPa. The conditions for the drying and hot pressing may be appropriately selected in accordance with the binder or solvent used.

<<Step C: Formation of Dense-Film Layer>>

The dense-film layer 32 may be formed by a vapor-phase process such as a vacuum deposition process, a sputtering process, an ion-plating process, or a laser ablation process. Specifically, the positive-electrode body on which the powder-formed layer 31 has been formed is placed in a vacuum chamber, and a sulfide is evaporated in the vacuum chamber to form the dense-film layer 32 on the surface of the powder-formed layer 31.

The conditions for the vapor-phase process are not particularly limited. However, the lower the concentration of impurities in the atmosphere of the film-formation chamber during film formation, the denser the resultant film becomes. Accordingly, the degree of vacuum in the film-formation chamber prior to film formation is preferably made 0.002 Pa or less.

<<Step D: Formation of Negative-Electrode Layer 2>>

In order to form the negative-electrode layer 2, the negative-electrode active-material layer 22 and the negative-electrode collector 21 may be sequentially stacked on the multilayer body including the members 11, 12, 31, and 32. For example, the negative-electrode active-material layer 22 is preferably formed by a vapor-phase process on the dense-film layer 32 of the multilayer body and the negative-electrode collector 21 constituted by a metal foil is preferably bonded to the negative-electrode active-material layer 22.

According to Steps described above, the nonaqueous-electrolyte battery 100 illustrated in FIG. 1 can be produced.

Second Embodiment

Overall Configuration of Nonaqueous-Electrolyte Battery

Figure 2:
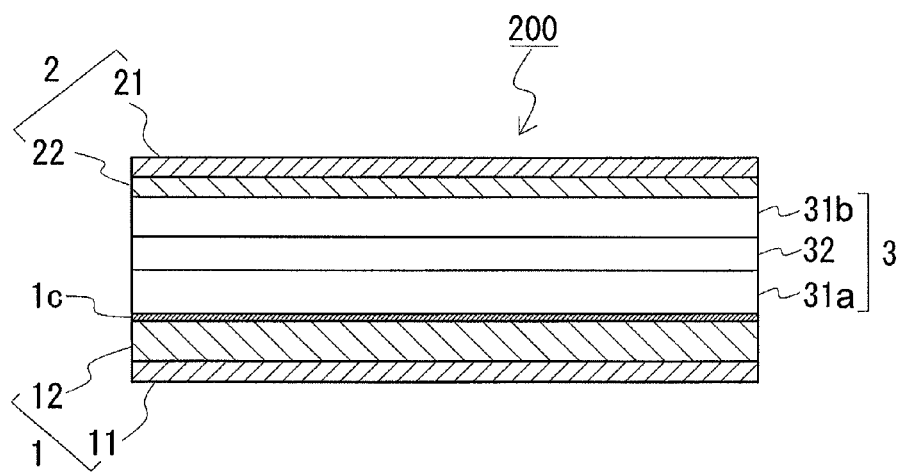
FIG. 2 is a longitudinal sectional view of a nonaqueous-electrolyte battery described in a second embodiment.

A nonaqueous-electrolyte battery 200 illustrated in FIG. 2 includes a positive-electrode layer 1, an intermediate layer 1c, a sulfide-solid-electrolyte layer (SE layer) 3, and a negative-electrode layer 2. The positive-electrode layer 1 includes a positive-electrode collector 11 and a positive-electrode active-material layer 12. The negative-electrode layer 2 includes a negative-electrode collector 21 and a negative-electrode active-material layer 22. The SE layer 3 includes a powder-formed layer 31a (powder-formed layer on the positive-electrode-active-material-layer-12 side of the SE layer 3) and a powder-formed layer 31b (powder-formed layer on the negative-electrode-active-material-layer-22 side of the SE layer 3) that are formed by compressing a sulfide electrolyte and a dense-film layer 32 formed by a vapor-phase process between these two powder-formed layers 31a and 31b.

In summary, the second embodiment is different from the first embodiment in that the powder-formed layer 31b is further formed between the dense-film layer 32 and the negative-electrode active-material layer 22.

In the second embodiment, the SE layer 3 preferably has a thickness of 1 mm or less. When the SE layer 3 has such a thickness, short circuits between the positive and negative electrodes can be suppressed with certainty and the size of the nonaqueous-electrolyte battery does not become excessively large. In view of meeting the demand for reduction of the size of nonaqueous-electrolyte batteries in recent years, the thickness of the SE layer 3 is preferably minimized as long as the short circuits can be suppressed. For example, the thickness of the layer may be 100 μm or less.

In view of reducing the size of the nonaqueous-electrolyte battery 200, the powder-formed layers (31a and 31b) each preferably have a thickness of 900 μm or less, more preferably 100 μm or less.

In view of reducing the stress, the powder-formed layers 31a and 31b each preferably have a thickness of 10 μm or more. The larger the thicknesses of the powder-formed layers 31a and 31b, the greater the effect of reducing the stress. Accordingly, the thicknesses of the powder-formed layers 31a and 31b may be appropriately selected in accordance with the thickness of the positive-electrode active-material layer 12, which is a factor dictating the magnitude of the stress.

As to the thickness of the dense-film layer 32 formed, in view of reducing the size of the nonaqueous-electrolyte battery 200, the thickness is preferably 100 μm or less, more preferably 20 μm or less. In view of filling pores in the surface of the powder-formed layer 31a, the thickness of the dense-film layer 32 is preferably 1 μm or more.

The thickness ratio (31a:32:31b) between the powder-formed layers (31a and 31b) and the dense-film layer 32 is preferably in the range of 10:1:10 to 1:1:1. In view of the functions of the powder-formed layers and the dense-film layer, the powder-formed layers 31a and 31b are desirably formed thicker than the dense-film layer 32. The thicknesses of the powder-formed layers 31a and 31b may be the same or different from each other.

In the second embodiment, a surface of the powder-formed layer 31b, the surface being in contact with the dense-film layer 32, has a surface roughness Rz (maximum height) (JIS/B0601:2001) of 1 μm or less, preferably 0.5 μm or less.

Materials for layers of the nonaqueous-electrolyte battery 200 in the second embodiment may be, for example, the same as in the first embodiment.

As in the first embodiment, the negative-electrode active-material layer 22 contains a negative-electrode active material serving as a main material of the battery reaction, and deposition of Li metal can occur on the negative-electrode active-material layer 22. However, the active material of the negative-electrode active-material layer 22 is preferably an active material having relatively low plastic deformability such as graphite, hard carbon, or lithium titanate. The reason for this will be described in <<Advantages of nonaqueous-electrolyte battery>> below.

<<Method for Producing Nonaqueous-Electrolyte Battery>>

Figure 3:
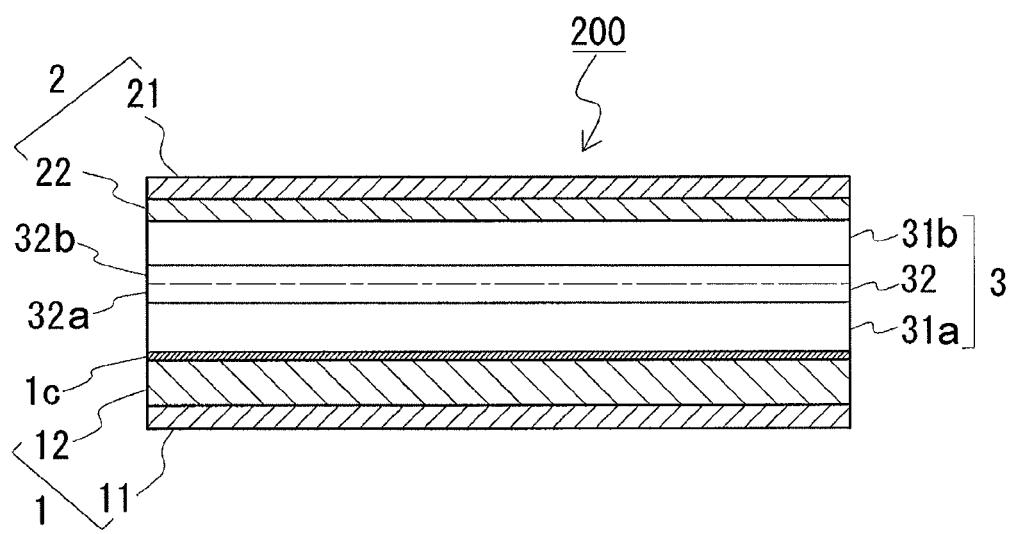
FIG. 3 is a longitudinal sectional view for illustrating a method for producing a nonaqueous-electrolyte battery described in a second embodiment.

Referring to FIG. 3, a method for producing the nonaqueous-electrolyte battery 200 of the second embodiment will be described. The production method of the second embodiment can be performed as follows: a positive-electrode-body-side multilayer body (the positive-electrode active-material layer 12, the powder-formed layer 31a, and a dense-film layer 32a) and a negative-electrode-body-side multilayer body (the negative-electrode active-material layer 22, the powder-formed layer 31b, and a dense-film layer 32b) are separately produced and bonded together such that the dense-film layers of the multilayer bodies are in contact with each other. For example, the production can be performed by the following steps.

(A) Produce a positive-electrode body including the positive-electrode active-material layer 12
(B) Form the powder-formed layer 31a on the positive-electrode body
(C) Form the dense-film layer 32a on the powder-formed layer 31a
(D) Produce a negative-electrode body including the negative-electrode active-material layer 22
(E) Form the powder-formed layer 31b on the negative-electrode body
(F) Form the dense-film layer 32b on the powder-formed layer 31b
(G) Bond the positive-electrode-body-side multilayer body and the negative-electrode-body-side multilayer body together such that the dense-film layers are in contact with each other.

The positive-electrode-body-side multilayer body is produced by Step A to Step C. As to Step A to Step C, Step A to Step C described in the first embodiment can be employed and the descriptions thereof are not repeated.

Hereinafter, the process of producing the negative-electrode-body-side multilayer body (Step D to Step F) will be described.

<<Step D: Production of Negative-Electrode Body>>

Production of the negative-electrode body may be performed [1] prior to Step E of the formation of the powder-formed layer 31b or [2] simultaneously with Step E described below. In this section of Step D, the case of [1] is described. The case of [2] will be described in the section of Step E described below.

The negative-electrode body may be constituted by the negative-electrode active-material layer 22 only or the negative-electrode collector 21 and the negative-electrode active-material layer 22. When a negative-electrode body constituted by the negative-electrode active-material layer 22 only is produced, powder serving as raw material (negative-electrode active-material powder and optionally a conductive aid such as electrolyte powder or acetylene black) may be compression-molded. In this case, the negative-electrode collector 21 may be formed on the negative-electrode body at a desired timing, for example, after Step E or Step F.

In order to produce a negative-electrode body in which the negative-electrode collector 21 and the negative-electrode active-material layer 22 are integrated, a substrate serving as the negative-electrode collector 21 may be first prepared and the negative-electrode active-material layer 22 may then be formed on the substrate. In this case, the negative-electrode active-material layer 22 may be formed by compression-molding powder serving as raw material. Alternatively, the negative-electrode active-material layer 22 may be formed by a coating process on the negative-electrode collector 21. Alternatively, the negative-electrode active-material layer 22 may be formed by a vapor-phase process such as a vacuum deposition process or a laser ablation process. When the negative-electrode active-material layer 22 is formed by a compression-molding process or a coating process, the effect of decreasing the surface roughness of the surface by the powder-formed layer is markedly exhibited as described below in <<Advantages of nonaqueous-electrolyte battery>> of the second embodiment.

The conditions for forming the negative-electrode active-material layer 22 by a coating process are substantially similar to conditions for forming the powder-formed layer 31 by a coating process described in the first embodiment. Accordingly, descriptions of the conditions are omitted here.

Here, when an intermediate layer (not shown) is formed between the negative-electrode active-material layer 22 and the powder-formed layer 31b, the intermediate layer may be formed on a surface of the negative-electrode body by a vapor-phase process or the like after Step D.

<<Step E: Formation of Powder-Formed Layer>>

The powder-formed layer 31b may be formed by a compression-molding process or a coating process. The compression-molding process is first described.

[Compression-Molding Process]

In order to form the powder-formed layer 31b, a sulfide powder having an average particle size of about 0.5 to about 2 μm is first prepared. The negative-electrode body produced by Step D is then placed in a mold and the sulfide powder is further placed on the negative-electrode body. The sulfide powder is compressed together with the negative-electrode body to form the powder-formed layer 31b on a surface of the negative-electrode body. The pressure applied is preferably 100 to 700 MPa. After the compression, a heat treatment may be performed. In this case, the temperature is preferably 100° C. to 300° C.

There is another compression-molding process: a powder serving as the raw material of the negative-electrode active-material layer 22 and a powder serving as the raw material of the powder-formed layer 31b are charged into a mold so as to form layers and the powders are compression-molded together. In this case, Steps D and E are simultaneously performed to produce the negative-electrode body provided with the powder-formed layer 31b. In addition, a metal foil that is to serve as the negative-electrode collector 21 may be placed at the bottom within the mold and a body in which the members 21, 22, and 31b have been integrated may be produced at one time. In any of the cases, the pressure applied is preferably 100 to 700 MPa; when a heat treatment is performed after the compression, the temperature is preferably 100° C. to 300° C. When an intermediate layer is formed, the raw material of the intermediate layer may also be prepared in the form of powder and charged into the mold.

[Coating Process]

When the powder-formed layer 31b is formed by a coating process, a slurry containing a sulfide solid electrolyte is first prepared. The slurry contains, in addition to the solid electrolyte, a binder such as an epoxy resin or silicone and a solvent such as ethylene glycol monoethyl ether acetate or heptane.

The slurry is applied to the negative-electrode active-material layer 22, may then be dried at 20° C. to 200° C. for about 1 to about 60 minutes, and then preferably subjected to hot pressing at 100° C. to 300° C. and at about 100 to about 600 MPa. The conditions for the drying and hot pressing may be appropriately selected in accordance with the binder or solvent used.

<<Step F: Formation of Dense-Film Layer>>

The dense-film layer 32b may be formed by a vapor-phase process such as a vacuum deposition process, a sputtering process, an ion-plating process, or a laser ablation process. Specifically, the negative-electrode body on which the powder-formed layer 31b has been formed is placed in a vacuum chamber, and a sulfide is evaporated in the vacuum chamber to form the dense-film layer 32b on the surface of the powder-formed layer 31b.

The conditions for the vapor-phase process are not particularly limited. However, the lower the concentration of impurities in the atmosphere of the film-formation chamber during film formation, the denser the resultant film becomes. Accordingly, the degree of vacuum in the film-formation chamber prior to film formation is preferably made 0.002 Pa or less.

Although Step A to Step F are sequentially described above, the order of Steps is not particularly limited. For example, Step D to Step F for production of the negative-electrode-body-side multilayer body may be performed prior to Step A to Step C for production of the positive-electrode-body-side multilayer body. Alternatively, corresponding Steps may be performed together (for example, Step C and Step F are simultaneously performed).

<<Step G: Bonding>>

In Step G, the positive-electrode-body-side multilayer body produced by Step A to Step C and the negative-electrode-body-side multilayer body produced by Step D to Step F are bonded together. As illustrated in FIG. 3, the multilayer bodies are bonded together such that the dense-film layers (32a and 32b) of the multilayer bodies are in contact with each other to produce the nonaqueous-electrolyte battery 200 in the second embodiment.

The bonding is desirably performed by application of pressure in a high-temperature atmosphere. The conditions for the application of pressure and heating are not particularly limited. For example, the battery can be produced by leaving the multilayer bodies at 16 MPa at 190° C. for 130 minutes.

<<Advantages of Nonaqueous-Electrolyte Battery>>

The nonaqueous-electrolyte battery 200 in the second embodiment provides, in addition to the advantages described in <<Advantages of nonaqueous-electrolyte battery>> of the first embodiment above, the following advantages.

Unlike the first embodiment, the powder-formed layer 31b is disposed between the negative-electrode active-material layer 22 and the dense-film layer 32. Accordingly, the irregularly shaped surface of the negative-electrode active-material layer is not in direct contact with the dense-film layer 32. Thus, the dense-film layer 32 is not affected by the surface roughness of the negative-electrode active-material layer and generation of thin portions in the dense-film layer 32 is suppressed. Thus, a structure having resistance to short circuits can be provided. In addition, since the dense-film layer 32 is formed on the surface having relatively low surface roughness, the dense-film layer 32 itself can be formed so as to have relatively small thickness.

In view of what is described above, in the case where an active material having relatively low plastic deformability such as hard carbon is used for the negative-electrode active-material layer 22 and in the case where the negative-electrode active-material layer 22 is formed by a compression-molding process or a coating process, since the negative-electrode active-material layer tends to have a high surface roughness, the advantages provided by the configuration of the second embodiment are markedly exhibited.

Similarly, the advantages provided by the configuration of the second embodiment are markedly exhibited in the case where the powder-formed layer 31b of the second embodiment is formed of a material having relatively high plastic deformability because such a material can be compressed to provide lower surface roughness.

EXAMPLES

Example 1

The nonaqueous-electrolyte battery 100 described with reference to FIG. 1 was actually produced (without the intermediate layer 1c). In addition, existing nonaqueous-electrolyte batteries having a SE layer provided by forming powder (corresponding to the powder-formed layer 31) or a SE layer formed by a vapor-phase process (corresponding to the dense-film layer 32) were produced. As described in Table I, the materials were common in all the nonaqueous-electrolyte batteries. As described in Table II, the differences among the nonaqueous-electrolyte batteries lie in the thicknesses of the powder-formed layer and the dense-film layer.

TABLE I

| Positive-electrode layer | Collector | SUS316L |
|---|---|---|
| | Active-material layer | $LiCoO_2 + Li_2S\text{---}P_2S_5$ |
| SE layer | | $Li_2S\text{---}P_2S_5$ |
| Negative-electrode layer | Collector | SUS316L |
| | Active-material layer | metal Li |

$LiCoO_2:Li_2S\text{---}P_2S_5 = 70$ mass %: 30 mass %
$Li_2S:P_2S_5 = 80$ mol %: 20 mol %

TABLE II

| | Positive-electrode layer | | SE layer | | Negative-electrode layer | |
|---|---|---|---|---|---|---|
| Samples | Collector (μm) | Active-material layer (μm) | Powder-formed layer (μm) | Dense-film layer (μm) | Active-material layer (μm) | Collector (μm) |
| 1 | 20 | 70 | 20 | 5 | 5 | 10 |
| 2 | 20 | 70 | 10 | 5 | 5 | 10 |
| 3 | 20 | 70 | 20 | 1 | 5 | 10 |
| 4 | 20 | 70 | 10 | 1 | 5 | 10 |
| 5 | 20 | 70 | 20 |   | 5 | 10 |
| 6 | 20 | 70 | 100 |   | 5 | 10 |
| 7 | 20 | 70 |   | 5 | 5 | 10 |
| 8 | 20 | 70 |   | 25 | 5 | 10 |

Samples 1 to 4 were each produced by forming the positive-electrode active-material layer 12 and the powder-formed layer 31 as a single member by a compression-molding process (pressure of 360 MPa) and forming the dense-film layer 32 and the negative-electrode active-material layer 22 on the single member by a vacuum deposition process. The collectors 11 and 21 were formed by bonding of metal foils.

Samples 5 and 6 were each produced by forming the positive-electrode active-material layer 12 and the powder-formed layer 31 as a single member by a compression-molding process (pressure of 360 MPa) and forming the negative-electrode active-material layer 22 on the single member by a vacuum deposition process. The collectors 11 and 21 were formed by bonding of metal foils.

Samples 7 and 8 were each produced by forming the positive-electrode active-material layer 12 by a compression-molding process (pressure of 360 MPa) and forming the dense-film layer 32 and the negative-electrode active-material layer 22 on the positive-electrode active-material layer 12 by a vacuum deposition process. The collectors 11 and 21 were formed by bonding of metal foils.

The nonaqueous-electrolyte batteries produced in the above-described manner were contained in coin cells and were subjected to a charge-discharge test for three cycles. As a result, the nonaqueous-electrolyte batteries of Samples 1 to 4 were charged to the end-of-charge voltage of 4.2 V in all the cycles. In contrast, all the nonaqueous-electrolyte batteries of Samples 5 to 8 became no longer chargeable to 4.2 V within the three cycles. The end-of-charge voltage of 4.2 V was not achieved because a short circuit occurred between the positive and negative electrodes.

Example 2

In Example 2, the positive-electrode active-material layer 12 of the positive-electrode layer 1 and the powder-formed layer 31 were both formed by a coating process.

<<Formation of Positive-Electrode Layer>>

The positive-electrode collector 11 constituted by an Al foil having a thickness of 20 μm was first prepared. A slurry to be applied to the positive-electrode collector 11 was then prepared. The component materials of the slurry were as follows.

[Positive-electrode active material (hereafter LCO)]: $LiCoO_2$ particles having an average size of 10 μm

[Solid electrolyte (hereafter SE)]: sulfide-solid-electrolyte particles having a size of 1 to 5 μm and formed by mechanical milling ($Li_2S:P_2S_5$=80%:20% in molar ratio)

[Conductive aid (hereafter AB)]: acetylene black (50% compressed product)

[Binder and solvent]: epoxy resin (JER1256 from Japan Epoxy Resin Co., Ltd.) and ethylene glycol monoethyl ether acetate, or silicone (CY52-005 from Dow Corning Toray Co., Ltd.) and heptane The epoxy-resin-based slurry was prepared by adjusting the slurry so as to have a solid-content concentration of 65 mass % and by vacuum kneading and defoaming at 2000 rpm for 30 minutes. The solid-content-mixing ratio (volume ratio) employed was LCO:SE:AB:epoxy resin=44:47:3:6.

On the other hand, the silicone-based slurry was prepared by adjusting the slurry so as to have a solid-content concentration of 70 mass % and by vacuum kneading and defoaming at 2000 rpm for 30 minutes. The solid-content-mixing ratio (volume ratio) employed was LCO:SE:AB:silicone=42:45:3:10.

The prepared slurries were then applied to Al foils (positive-electrode collectors 11) with a squeegee. The application thickness was 300 μm. When the applied slurry was the epoxy-resin-based slurry, the temperature was elevated from room temperature to 160° C. and the slurry was dried by being held at 160° C. for 3 minutes. When the applied slurry was the silicone-based slurry, the temperature was elevated from room temperature to 100° C. and the slurry was dried by being held at 100° C. for 3 minutes.

Finally, the dried slurries were hot-pressed to provide the positive-electrode active-material layers 12 having a desired thickness. The conditions for the hot pressing were 200° C.×540 MPa. The positive-electrode active-material layers 12 having been hot-pressed had a thickness of 70 μm.

<<Formation of Powder-Formed Layer>>

As to slurries used for forming the powder-formed layers 31, materials used for the formation of the positive-electrode active-material layers 12 were also used.

An epoxy-resin-based slurry for forming the powder-formed layer 31 was prepared by adjusting the slurry so as to have a solid-content concentration of 65 mass % and by vacuum kneading and defoaming at 2000 rpm for 30 minutes. The solid-content-mixing ratio (volume ratio) employed was SE:epoxy resin=94:6.

On the other hand, a silicone-based slurry was prepared by adjusting the slurry so as to have a solid-content concentration of 70 mass % and by vacuum kneading and defoaming at 2000 rpm for 30 minutes. The solid-content-mixing ratio (volume ratio) employed was SE:silicone=90:10.

The prepared slurries were then applied to the positive-electrode active-material layers 12 of the positive-electrode bodies with a squeegee. The application thickness was 100 μm. When the applied slurry was the epoxy-resin-based slurry, the slurry was dried by being held at 160° C. for 3 minutes. When the applied slurry was the silicone-based slurry, the slurry was dried by being held at 100° C. for 3 minutes.

Finally, the dried slurries were hot-pressed to provide the powder-formed layers 31 having a desired thickness. The conditions for the hot pressing were 200° C.×540 MPa. The powder-formed layers 31 having been hot-pressed had a thickness of 10 μm.

<<Formation of Other Layers>>

The other layers were formed as in Example 1.

The nonaqueous-electrolyte batteries produced in the above-described manner were contained in coin cells and were subjected to a charge-discharge test for three cycles. As a result, whether the positive-electrode active-material layer 12 and the powder-formed layer 31 were formed from the epoxy-resin-based slurries or the silicone-based slurries, the nonaqueous-electrolyte battery was charged to the end-of-charge voltage of 4.2 V in all the cycles.

Example 3

Nonaqueous-electrolyte batteries according to the second embodiment of the present invention were evaluated.

The positive-electrode active material used was $LiCoO_2$ particles having an average size of 10 μm. The solid electrolyte (SE powder) used was sulfide-solid-electrolyte particles having a size of 1 to 5 μm and formed by mechanical milling ($Li_2S:P_2S_5$=80%:20% in molar ratio). The conductive aid used was acetylene black (50% compressed product). The negative-electrode active materials used were hard carbon and graphite.

The positive-electrode-body-side multilayer bodies were first produced.

As to Samples 1, 2, 4, and 5, each multilayer body was produced by forming the positive-electrode active-material layer 12 (positive-electrode active material, SE powder, and conductive aid) and the powder-formed layer 31a (SE powder) as a single member by a compression-molding process (pressure of 360 MPa) and forming the dense-film layer 32a on the single member by a vacuum deposition process. The collector 11 was formed by bonding of a metal foil.

As to Samples 3 and 6, multilayer bodies were produced as with the multilayer bodies of Samples 1, 2, 4, and 5 except that the dense-film layer was not formed.

The negative-electrode-body-side multilayer bodies were then produced.

As to Samples 2, 3, 5, and 6, each multilayer body was produced by forming the negative-electrode active-material layer 22 (negative-electrode active material, SE powder, and conductive aid) and the powder-formed layer 31b (SE powder) as a single member by a compression-molding process (pressure of 360 MPa) and forming the dense-film layer 32b on the single member by a vacuum deposition process. The collector 21 was formed by bonding of a metal foil.

As to Samples 1 and 4, multilayer bodies were produced as with the multilayer bodies of Samples 2, 3, 5, and 6 except that the powder-formed layer was not formed and the dense-film layer was formed on the negative-electrode active-material layer formed by a compression-molding process at a pressure of 360 MPa.

Such a positive-electrode-body-side multilayer body and such a negative-electrode-body-side multilayer body were bonded together such that the dense-film layers or the positive-electrode-body-side powder-formed layer and the negative-electrode-body-side dense-film layer were in contact with each other. The multilayer bodies were compressed at 16 MPa and left in an atmosphere at 190° C. for 220 minutes to thereby produce a nonaqueous-electrolyte battery.

Table III describes, in each Sample, the thicknesses of layers and the surface roughness Rz (maximum height) (JIS/B0601:2001) of a surface (dense-film-layer-side surface) of the powder-formed layer.

TABLE III

| | Positive-electrode layer | | SE layer | | | | Negative-electrode layer | | | Surface roughness Rz of dense-film-layer-side surface of negative-electrode-side powder-formed layer (μm) |
|---|---|---|---|---|---|---|---|---|---|---|
| Samples | Collector (μm) | Active-material layer (μm) | Positive-electrode-side powder-formed layer (μm) | Positive-electrode-side dense-film layer (μm) | Negative-electrode-side dense-film layer (μm) | Negative-electrode-side powder-formed layer (μm) | Active material | Active-material layer (μm) | Collector (μm) | |
| 1 | 20 | 70 | 20 | 5 | 5 | — | Hard carbon | 70 | 10 | 4.2 μm |
| 2 | 20 | 70 | 20 | 5 | 5 | 20 | Hard carbon | 70 | 10 | 0.7 μm |
| 3 | 20 | 70 | 20 | — | 5 | 20 | Hard carbon | 70 | 10 | 0.6 μm |
| 4 | 20 | 70 | 20 | 5 | 5 | — | Graphite | 70 | 10 | 2.0 μm |
| 5 | 20 | 70 | 20 | 5 | 5 | 20 | Graphite | 70 | 10 | 0.5 μm |
| 6 | 20 | 70 | 20 | — | 5 | 20 | Graphite | 70 | 10 | 0.6 μm |

The batteries of Samples 1 to 6 obtained were contained in coin cells and were subjected to a charge-discharge test for three cycles. As a result, the batteries of Samples 1 and 4 became no longer chargeable to 4.2 V within the three cycles. The other batteries were charged to the end-of-charge voltage of 4.2 V in all the cycles.

As in Example 3 above, when the negative-electrode active-material layer is formed of a material having relatively low plastic deformability such as hard carbon or graphite or the negative-electrode active-material layer is formed by a compression-molding process, the negative-electrode active-material layer tends to have high surface roughness. However, by forming the powder-formed layer between the negative-electrode active-material layer and the dense-film layer, irregularities in the surface of the negative-electrode active-material layer are not in direct contact with the dense-film layer. In addition, since the powder-formed layer has higher plastic deformability than the negative-electrode active-material layer, it deforms under compression and the surface profile of a molding punch is considerably transferred to the powder-formed layer. Accordingly, the surface roughness of the powder-formed layer is probably improved.

Thus, by forming the powder-formed layer between the negative-electrode active-material layer and the dense-film layer, generation of thin portions in the dense-film layer due to contact with the irregularly shaped surface of the negative-electrode active-material layer can be suppressed and generation of Li dendrites can be suppressed. In contrast, when the powder-formed layer is not formed between the negative-electrode active-material layer and the dense-film layer, the dense-film layer has thin portions due to irregularities of the negative-electrode active-material layer and current concentration occurs during charge and discharge. Thus, Li dendrites are probably generated and the voltage is not sufficiently increased during charge.

The present invention is not limited to the above-described embodiments at all. That is, the configurations of the nonaqueous-electrolyte batteries described in the above-described embodiments can be properly modified without departing from the spirit and scope of the present invention.

INDUSTRIAL APPLICABILITY

A nonaqueous-electrolyte battery according to the present invention is suitably usable as a power supply of an electric device that is intended to be repeatedly charged and discharged.

Reference Signs List

| | | | |
|---|---|---|---|
| 100, 200 | nonaqueous-electrolyte battery | | |
| 1 | positive-electrode layer | | |
| 11 | positive-electrode collector | 12 | positive-electrode active-material layer |
| 2 | negative-electrode layer | | |
| 21 | negative-electrode collector | 22 | negative-electrode active-material layer |
| 3 | sulfide-solid-electrolyte layer (SE layer) | | |
| 31, 31a, 31b | powder-formed layer | 32, 32a, 32b | dense-film layer |
| 1c | intermediate layer | | |

The invention claimed is:

1. A nonaqueous-electrolyte battery comprising a positive-electrode active-material layer containing a Li-containing oxide; a negative-electrode active-material layer on which deposition of Li metal can occur; and a sulfide-solid-electrolyte layer disposed between these active-material layers,
wherein the sulfide-solid-electrolyte layer includes
a powder-formed layer formed on a positive-electrode-active-material-layer side of the sulfide-solid-electrolyte layer, and
a dense-film layer formed on a surface of the powder-formed layer by a vapor-phase process,
wherein the sulfide-solid-electrolyte layer includes an additional powder-formed layer, and the additional powder-formed layer is formed between the dense-film layer and the negative-electrode active-material layer, and
wherein a dense-film-layer-side surface of the additional powder-formed layer has a surface roughness Rz of 1 μm or less.

2. The nonaqueous-electrolyte battery according to claim 1, wherein the sulfide-solid-electrolyte layer has a thickness of 1 mm or less.

3. The nonaqueous-electrolyte battery according to claim 1, wherein the powder-formed layer has a thickness of 900 μm or less.

4. The nonaqueous-electrolyte battery according to claim 1, wherein the dense-film layer has a thickness of 100 μm or less.

5. A method for producing a nonaqueous-electrolyte battery including a positive-electrode active-material layer containing a Li-containing oxide, a negative-electrode active-material layer on which deposition of Li metal can occur, and a sulfide-solid-electrolyte layer disposed between these active-material layers, the method comprising:
a step of producing a positive-electrode body including the positive-electrode active-material layer;
a step of forming a powder-formed layer serving as a part of the sulfide-solid-electrolyte layer, on the positive-electrode body; and
a step of forming a dense-film layer serving as a part of the sulfide-solid-electrolyte layer, on the powder-formed layer by a vapor-phase process,
wherein the sulfide-solid-electrolyte layer includes an additional powder-formed layer, and the additional powder-formed layer is formed between the dense-film layer and the negative-electrode active-material layer, and
wherein a dense-film-layer-side surface of the additional powder-formed layer has a surface roughness Rz of 1 μm or less.

6. The method for producing a nonaqueous-electrolyte battery according to claim 5, wherein the powder-formed layer is formed by a compression-molding process.

7. The method for producing a nonaqueous-electrolyte battery according to claim 5, wherein the powder-formed layer is formed by a coating process.

8. The method for producing a nonaqueous-electrolyte battery according to claim 5, wherein the positive-electrode body is produced by preparing a positive-electrode collector and forming the positive-electrode active-material layer on the positive-electrode collector by a coating process.

9. The method for producing a nonaqueous-electrolyte battery according to claim 5, comprising:
a step of producing a positive-electrode-body-side multilayer body, the step including a substep of producing a positive-electrode body including the positive-electrode active-material layer; a substep of forming a powder-formed layer serving as a part of the sulfide-solid-electrolyte layer, on the positive-electrode body; and a substep of forming a dense-film layer serving as a part of the sulfide-solid-electrolyte layer, on the powder-formed layer by a vapor-phase process;
a step of producing a negative-electrode-body-side multilayer body, the step including a substep of producing a negative-electrode body including the negative-electrode active-material layer; a substep of forming a powder-formed layer serving as a part of the sulfide-solid-electrolyte layer, on the negative-electrode body; and a substep of forming a dense-film layer serving as a part of the sulfide-solid-electrolyte layer, on the powder-formed layer by a vapor-phase process; and
a step of press-bonding the positive-electrode-body-side multilayer body and the negative-electrode-body-side multilayer body together such that the dense-film layers of the multilayer bodies are in contact with each other.

* * * * *